(12) United States Patent
Tai et al.

(10) Patent No.: US 9,815,020 B2
(45) Date of Patent: Nov. 14, 2017

(54) DEHUMIDIFICATION SYSTEM

(71) Applicant: Industrial Technology Research Institute, Hsinchu (TW)

(72) Inventors: Chin-Chih Tai, Kaohsiung (TW); Yun-Hsin Wang, Kaohsiung (TW); Yi-Shan Lee, Taipei (TW); Tzer-Shen Lin, Hsinchu (TW)

(73) Assignee: Industrial Technology Reserach Institute, Hsinchu (TW)

( * ) Notice: Subject to any disclaimer, the term of this patent is extended or adjusted under 35 U.S.C. 154(b) by 1045 days.

(21) Appl. No.: 13/969,620

(22) Filed: Aug. 19, 2013

(65) Prior Publication Data
US 2014/0174295 A1 Jun. 26, 2014

Related U.S. Application Data

(60) Provisional application No. 61/740,441, filed on Dec. 20, 2012.

(30) Foreign Application Priority Data

May 2, 2013 (TW) .............................. 102115720 A

(51) Int. Cl.
*B01D 53/26* (2006.01)
*B01D 53/28* (2006.01)
(Continued)

(52) U.S. Cl.
CPC ......... *B01D 53/28* (2013.01); *B01D 53/0407* (2013.01); *B01D 53/261* (2013.01);
(Continued)

(58) Field of Classification Search
CPC ........ B01D 2253/102; B01D 2253/108; B01D 2253/116; B01D 2253/34; B01D 2257/80;
(Continued)

(56) References Cited

U.S. PATENT DOCUMENTS 4,348,458 A * 9/1982 Otstot .................... B01D 53/22
428/364
4,871,607 A 10/1989 Kuma et al.
(Continued)

FOREIGN PATENT DOCUMENTS

CN 1481928 3/2004
CN 101784316 7/2010
(Continued)

OTHER PUBLICATIONS

"Office Action of Taiwan Counterpart Application", dated Apr. 22, 2015, p. 1-p. 5.
(Continued)

*Primary Examiner* — Jason M Greene
(74) *Attorney, Agent, or Firm* — Muncy, Geissler, Olds & Lowe, P.C.

(57) ABSTRACT

Provided is a dehumidification system including an air directing device and an adsorbent hollow fiber module. The air directing device is used for conveying air. The adsorbent hollow fiber module can adsorb the moisture in the air as the air passes through the adsorbent hollow fiber module. The adsorbent hollow fiber module includes at least one adsorbent hollow fiber. The adsorbent hollow fiber has a tubular body having a first end and a second end and a channel disposed in the tubular body and extending from the first end to the second end.

19 Claims, 12 Drawing Sheets

(51) Int. Cl.
  *B01D 53/04* (2006.01)
  *B01J 20/28* (2006.01)
  *B01J 20/18* (2006.01)
  *B01J 20/20* (2006.01)
  *B01J 20/10* (2006.01)
  *D01D 5/24* (2006.01)

(52) U.S. Cl.
  CPC ............ *B01J 20/103* (2013.01); *B01J 20/18* (2013.01); *B01J 20/20* (2013.01); *B01J 20/28023* (2013.01); *D01D 5/24* (2013.01); *B01D 2253/102* (2013.01); *B01D 2253/108* (2013.01); *B01D 2253/116* (2013.01); *B01D 2253/34* (2013.01); *B01D 2257/80* (2013.01); *B01D 2258/06* (2013.01)

(58) Field of Classification Search
  CPC ............ B01D 2258/06; B01D 53/0407; B01D 53/261; B01D 53/28; B01D 53/0462; B01J 20/103; B01J 20/18; B01J 20/20; B01J 20/28023; D01D 5/24
  See application file for complete search history.

(56) References Cited

U.S. PATENT DOCUMENTS

| | | | |
|---|---|---|---|
| 5,139,668 | A | 8/1992 | Pan et al. |
| 6,478,855 | B1 | 11/2002 | Okano |
| 7,959,720 | B2 | 6/2011 | Deckman et al. |
| 8,257,474 | B2 | 9/2012 | Lively et al. |
| 2003/0141238 | A1 | 7/2003 | Herczeg |
| 2008/0314244 | A1* | 12/2008 | Kelley ............... B01D 53/02 95/41 |
| 2010/0035751 | A1* | 2/2010 | Perera ............... B01D 53/02 502/402 |
| 2011/0289955 | A1 | 12/2011 | Okano |
| 2012/0304856 | A1* | 12/2012 | Kanetsuki ............ B01D 53/228 95/47 |

FOREIGN PATENT DOCUMENTS

| | | |
|---|---|---|
| CN | 201744280 | 2/2011 |
| CN | 102430323 | 5/2012 |
| JP | 2000279744 | 10/2000 |
| TW | 175324 | 12/1991 |
| TW | I359932 | 3/2012 |
| WO | 9322602 | 11/1993 |
| WO | 2007007051 | 1/2007 |
| WO | 2008110820 | 9/2008 |

OTHER PUBLICATIONS

"Office Action of Chinese Counterpart Application", dated May 27, 2015, p. 1-p. 7.

Li et al., "Water vapor permeation and compressed air dehydration performances of modified polyimide membrane," Separation and Purification Technology, May 2008, pp. 330-334, 60.

Lanteri et al., "Electrokinetic characterization of hollow fibers by streaming current, streaming potential and electric conductance," Journal of Membrane Science, Sep. 2012, pp. 193-200, 411-412.

Kneifel et al., "Hollow fiber membrane contactor for air humidity control: Modules and membranes," Journal of Membrane Science, May 2006, pp. 241-251, 276.

Ostwal et al., "Water Sorption of Acid-Doped Polyaniline Powders and Hollow Fibers: Equilibrium and Kinetic Response," Ind. Eng. Chem. Res., Jun. 13, 2006, pp. 6021-6031, 45.

A.E. Kabeel, "Adsorption-desorption operations of multilayer desiccant packed bed for dehumidification applications," Renewable Energy, Jan. 2009. pp. 255-265, 34.

Jia et al., "Use of compound desiccant to develop high performance desiccant cooling system," International Journal of Refrigeration, Mar. 2007, pp. 345-353, 30.

Chung et al., "Optimization of desiccant wheel speed and area ratio of regeneration to dehumidification as a function of regeneration temperature," Solar Energy, May 2008.

* cited by examiner

DEHUMIDIFICATION SYSTEM

CROSS-REFERENCE TO RELATED APPLICATION

This application claims the priority benefits of U.S. provisional application Ser. No. 61/740,441, filed on Dec. 20, 2012 and Taiwan application serial no. 102115720, filed on May 2, 2013. The entirety of each of the above-mentioned patent applications is hereby incorporated by reference herein and made a part of this specification.

TECHNICAL FIELD

The technical field relates to a dehumidification system.

BACKGROUND

The dehumidification technology typically includes the compression process, the refrigeration process, the liquid sorption process, the solid sorption process, or the membrane separation process, wherein the refrigeration process and the solid sorption process are the most common ones. In view of the energy crisis, solid sorption by zeolite has drawn much research attention because of energy saving concern and cost consideration. In this regard, the adsorption capability of zeolite should be further improved, and the energy and time required by gas desorption from the zeolite need to be further decreased. Besides, the addition of binder during the pelletization process of zeolite can substantially reduce the adsorption amount of zeolite and decelerate the adsorption and desorption rate.

SUMMARY

One of exemplary embodiments provides a dehumidification system including an air directing device and an adsorbent hollow fiber module. The air directing device is used for conveying air. The adsorbent hollow fiber module can adsorb the moisture in the air as the air passes through the adsorbent hollow fiber module. The adsorbent hollow fiber module includes at least one adsorbent hollow fiber. The adsorbent hollow fiber has a tubular body having a first end and a second end and a channel disposed in the tubular body and extending from the first end to the second end.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of this disclosure.

DETAILED DESCRIPTION OF DISCLOSED EMBODIMENTS

In this specification, recitation of ranges of values are used to serve as a shorthand method of referring individually to each separate value falling within the range, unless otherwise indicated herein, and each separate value is incorporated into the specification as if it were individually recited herein. For example, a range of "1 µm to 100 µm" includes "2 µm to 58 µm" even if the specification does not particularly recite values other than "1 µm" and "100 µm."

One of the exemplary embodiments provides a dehumidification system, including an air directing device and an adsorbent hollow fiber. The air directing device is used to covey the air. The air directing device can be a fan, e.g., a DC fan, a Kuhi fan, or a turbofan, the flow rate thereof lying in 2-3000 L/min, and the operation voltage of the fan lies between 5-24 $V_{DC}$. With the driving force provided by the air directing device, the air in the environment may pass through the hollow portion of the adsorbent hollow fiber. The adsorbent hollow fiber includes an adsorbent material which adsorbs the moisture in the air when the air passes through the adsorbent hollow fiber.

The structure and fabricating method of the adsorbent hollow fiber are specifically described in the following embodiments and examples. The adsorbent hollow fiber, however, is no limited thereto. Other embodiments of the adsorbent hollow fiber may be found in the International Patent Application WO 2008/110820 A1, filed on Mar. 14, 2008, entitled "regenerable adsorption unit"; the U.S. patent application Ser. No. 13/719,945 filed on Dec. 19, 2012, entitled "hollow fibers having winding channel"; and the U.S. provisional patent application No. 61/740,441 filed on Dec. 20, 2012, entitled "hollow fiber adsorbent air dehumidifier," the entire content of which are incorporated by reference herein.

Figure 1:
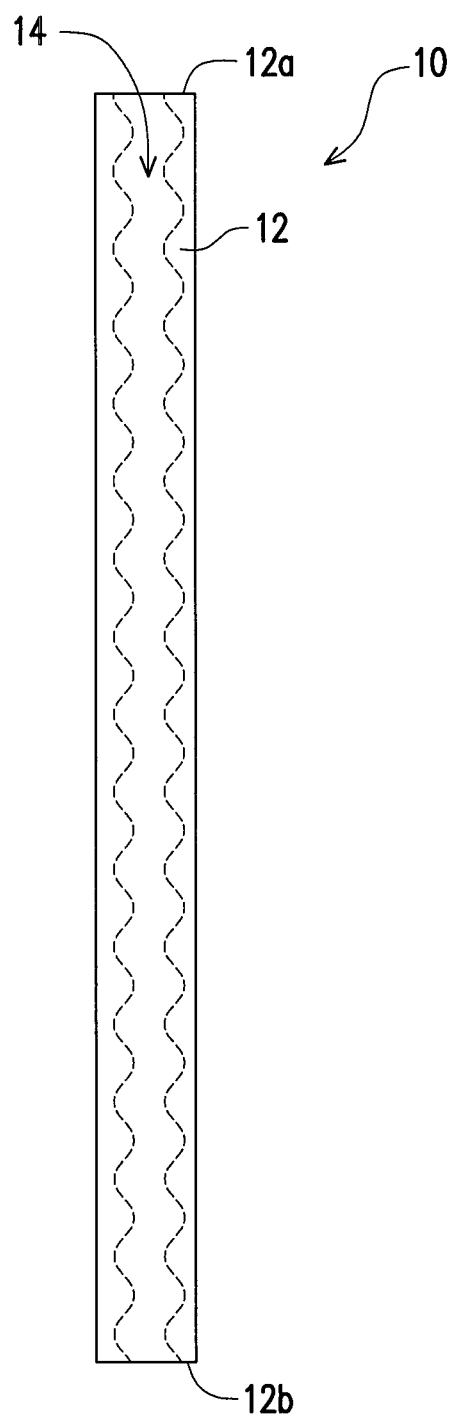
FIG. 1 shows the side view of an embodiment of the adsorbent hollow fiber.

FIG. 1 shows the side view of an embodiment of the adsorbent hollow fiber. To present the structure of the adsorbent hollow fiber clearly, FIG. 1 further illustrates the winding channel inside of the adsorbent hollow fiber with dotted line.

Referring to FIG. 1, in this embodiment, the adsorbent hollow fiber 10 includes a tubular body 12 and a winding channel 14. The tubular body 12 has a first end 12a and a second end 12b. The winding channel 14 is disposed in the tubular body 12 and extends from the first end 12a to the second end 12b. The tubular body 12 has a porous structure in this embodiment, and thus, gaseous molecule may adsorb to the tubular body 12 while passing through the winding channel 14. The winding channel 14 may be a spiral channel, but this disclosure is not limited thereto. In some embodiments, the winding channel 14 may be a zigzag channel or other curved channels. Alternatively, the adsorbent hollow fiber can be composed of a tubular body and a straight channel (not shown). If the channel has a curved structure, the air would travel a longer path (as compared to a straight channel) while passing through the adsorbent hollow fiber, which may improve the adsorption effect.

In this embodiment, the winding channel 14 has a diameter of 0.05 mm to 9.95 mm, e.g., 0.1 mm to 5 mm, 0.5 mm to 2 mm, 0.2 mm to 0.6 mm, 1 mm to 3 mm. The tubular body 12 has a length 10% to 90% (e.g., 20% to 60%, 20% to 40%, 10% to 80%, 20% to 70%) of that of the winding channel 14, a thickness of 0.05 mm to 9.95 mm, e.g., 0.5 mm to 4 mm, 0.5 mm to 2 mm, 0.1 mm to 9 mm, 0.2 mm to 8 mm, 1 mm to 4 mm, 1 mm to 5 mm, and an outer diameter of 0.1 mm to 10 mm, e.g., 1 mm to 5 mm, 1 to 3 mm, 3 mm to 8 mm, 2 mm to 4 mm, 0.2 mm to 2.5 mm, 0.3 mm to 6 mm, 0.5 mm to 3 mm. The tubular body 12 can have an effective surface porosity (i.e., surface porosity over pore length, $\epsilon/L_p$) of 100 to 10000, e.g., 200 to 8000, 400 to 6000, and a pore size of 1 nm to 50 μm, e.g., 0.1 μm to 10 μm, 1 nm to 100 nm, 10 nm to 50 μm. The surface-area-to-volume ratio of the tubular body 12 is 10 $m^2/m^3$ to 20000 $m^2/m^3$, e.g., 10 $m^2/m^3$ to 10000 $m^2/m^3$, 200 $m^2/m^3$ to 6000 $m^2/m^3$, 1000 $m^2/m^3$ to 4000 $m^2/m^3$, 100 $m^2/m^3$ to 5000 $m^2/m^3$, 250 $m^2/m^3$ to 3000 $m^2/m^3$, and 500 $m^2/m^3$ to 8000 $m^2/m^3$.

In this embodiment, the adsorbent hollow fiber 10 includes a polymer material and an adsorbent material. The polymer can be used as a binder, and the content thereof in the adsorbent hollow fiber 10 is, for example, 5 wt % to 90 wt %. The polymer material for the adsorbent hollow fiber 10 is chose in consideration of at least the following factors: 1) the mechanical property (e.g., flexibility) required by the adsorbent hollow fiber 10, 2) the heat resistance property required by the adsorbent hollow fiber 10, and 3) the compatibility of the polymer material and the adsorbent material. The polymer material includes, for example, polysulfones (PSF), polyethersulfone, (PESF), polyphenylsulfone (PPSU), polyvinylidene fluoride (PVDF), cellulose acetate (CA), polyimide (PI), or a mixture thereof.

In this embodiment, the content of the adsorbent material in the adsorbent hollow fiber 10 can be 80 wt % to 95 wt %. The adsorbent material can be presented as powder. For example, the adsorbent material can be type A zeolite (e.g., 3A, 4A, or 5A), type X zeolite (10X), type Y zeolite (13X), silica gel, carbon molecular sieve, high silica molecular sieve, activated carbon, or a combination thereof.

In this embodiment, the adsorbent hollow fiber 10 can further include a conductive material. Generally, for desorbing the gas from the adsorbent material, the adsorbent material is heated; and the gaseous molecule adsorbed thereon is imparted with heat energy so that it is able to overcome attraction force exerted by the adsorbent material. If the adsorbent hollow fiber 10 contains a conductive material, heating of the adsorbent hollow fiber 10 may be carried out by joule heating (i.e., passing current through the adsorbent hollow fiber 10), and an additional heating apparatus is not required. The entire system can be simplified. The conductive material can also be presented as powder. For example, the conductive material can be activated carbon, graphite, carbon black, metal powder, metal oxide (e.g., CuO or $BaTiO_3$) powder, or a combination thereof. Additionally, the conductive material can be a material having a positive temperature coefficient of resistance (PTC). Specifically, as temperature rises to a certain extent, the electrical resistance of the PTC conductive material increases significantly, reducing the current flowing through the adsorbent hollow fiber and in turn, decreasing the heating rate. The PTC material thereby provides a protection function for the dehumidification system.

Figure 2:
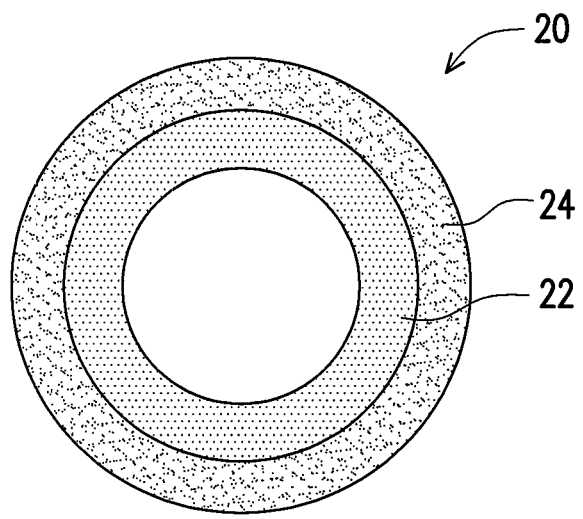
FIG. 2 shows the cross-sectional view of an embodiment of the adsorbent hollow fiber.

FIG. 2 shows a cross-sectional view of an embodiment of the adsorbent hollow fiber. The cross-sectional plane shown in FIG. 2 is perpendicular to the axial direction of the adsorbent hollow fiber. In FIG. 2, the adsorbent hollow fiber 20 is a double layer structure including a first layer 22 and a second layer 24. The present disclosure, however, is not limited thereto. In some other embodiments, the adsorbent hollow fiber 20 may be a single layer structure or a multi-layer (i.e., more than two layers) structure.

Referring to FIG. 2, the adsorbent hollow fiber 20 includes a first layer 22 and a second layer 24. In FIG. 2, the first layer 22 is illustrated as the inner layer while the second layer 24 is the outer layer. The following description in connection to the first layer 22 and the second layer 24, however, is not limited thereto. In other embodiments of the double layer structure, the "first layer" can be the outer layer and the "second layer" can be the inner layer.

The first layer 22 and the second layer 24 include the same or different materials. Specifically, the first layer 22 and the second layer 24 can respectively include the same or different polymer material, the same or different adsorbent material and/or the same or different conductive material. As to how to choose the material for these layers, the description in relation to FIG. 1 may be referred. Further, if the first layer 22 and the second layer 24 are composed of the same material, the porosity or the pore diameter of the first layer 22 and the second layer 24 should be different so that the first layer 22 and the second layer 24 can be distinguished from one another.

In an embodiment, the first layer 22 and the second layer 24 contains different adsorbent materials; in this case, the adsorbent hollow fiber 20 become a multi-functional adsorbent fiber. For example, with a suitable selection of material, the first layer 22 can adsorb moisture, and the second layer 24 can adsorb carbon dioxide or can be used as a deodorant. Additionally, with a double layer (or multi-layer) structure, the properties of the adsorbent hollow fiber can be suitably adjusted. For example, the inner layer can include a greater amount of adsorbent material (e.g., greater than 50 wt %) to enhance the adsorption effect of the adsorbent hollow fiber; meanwhile, the outer layer can include a greater amount of polymer material (e.g., greater than 50 wt %) to ensure the mechanical properties of the adsorbent hollow fiber.

In an embodiment, the first layer 22 contains an adsorbent material but does not include conductive material, while the second layer 24 does include a conductive material. In this case, the second layer 24 is referred to as conductive hollow fiber and can be used to heat (i.e., by joule heating) the adsorbent hollow fiber 20. In this embodiment, the heat resistances required by the first layer 22 and the second layer 24 are different, and consequently the first layer 22 and the second layer 24 should include different polymer materials. For example, the first layer 22 may contain PESF or PPSU, while the second layer 24 may contain PI and, at the same time, include PESF or PPSU. In another embodiment, in addition to the conductive material, the second layer 24 further contains an adsorbent material in an amount of, for example, 10 wt %, so as to improve the adsorption property of the adsorbent hollow fiber 20. In FIG. 2, the conductive hollow fiber is arranged as the outer layer of the adsorbent hollow fiber 20, but the present disclosure is not limited thereto. In other embodiments, the conductive hollow fiber can be the inner layer of the adsorbent hollow fiber.

One of the fabrication methods of the adsorbent hollow fiber is exemplarily described hereinafter. Although a double layer fiber is taken as an example in the following description, persons having ordinary skill in the field of spinning, in view of the following description, should be able to make any fiber described above (e.g., a single layer fiber or a multi-layer fiber) without undue experiments.

1. [Preparation of Spinning Dope]

1) Preparation of Polymer Solution

A polymer material is selected (e.g., about 100 g) and put into a 1 L glass bottle. The polymer material includes PSF, PESF, PPSU, CA, PVDF, or PI. N-methyl-2-pyrrolidone (NMP), dimethyl acetamide (DMAC), dimethyl formamide (DMF), or other organic solvent is added into the glass bottle in an amount of, for example, 400 ml to 500 ml. The mixture of polymer and organic solvent is stirred in a roller agitator with a rotational speed of about 50 rpm to 100 rpm for about 24 hours until the polymer is completely dissolved in the solvent.

2-1) Preparation of the Spinning Dope of the Adsorbent Fiber

The solution of polymer and organic solvent is placed into a high-speed agitator (e.g., rotational speed of 1000 rpm to 3000 rpm), and an adsorbent material in powder form (e.g., 3A, 4A, 5A, 13X, or silica gel) is slowly added into the solution in an amount 4 to 7 times weight (e.g., 500 g to 700 g) of the polymer material. The solution is stirred for 6 to 12 hours.

2-2) Preparation of the Spinning Dope of the Conductive Fiber

The solution of polymer and organic solvent is placed into a high-speed agitator (e.g., rotational speed of 1000 rpm to 3000 rpm), and an conductive material in powder form (e.g., carbon molecular sieves, activated carbon, carbon black, graphite, or metal oxide) is slowly added into the solution in an amount 4 to 7 times weight (e.g., 500 g to 700 g) of the polymer material. The solution is stirred for 6 to 12 hours.

3) The mixture prepared in step 2-1) or 2-2) is placed into a roller agitator (e.g., a rotational speed of 50 rpm to 100 rpm) and degassed for 24 to 48 hours.

2. [Spinning Process]

Figure 3:
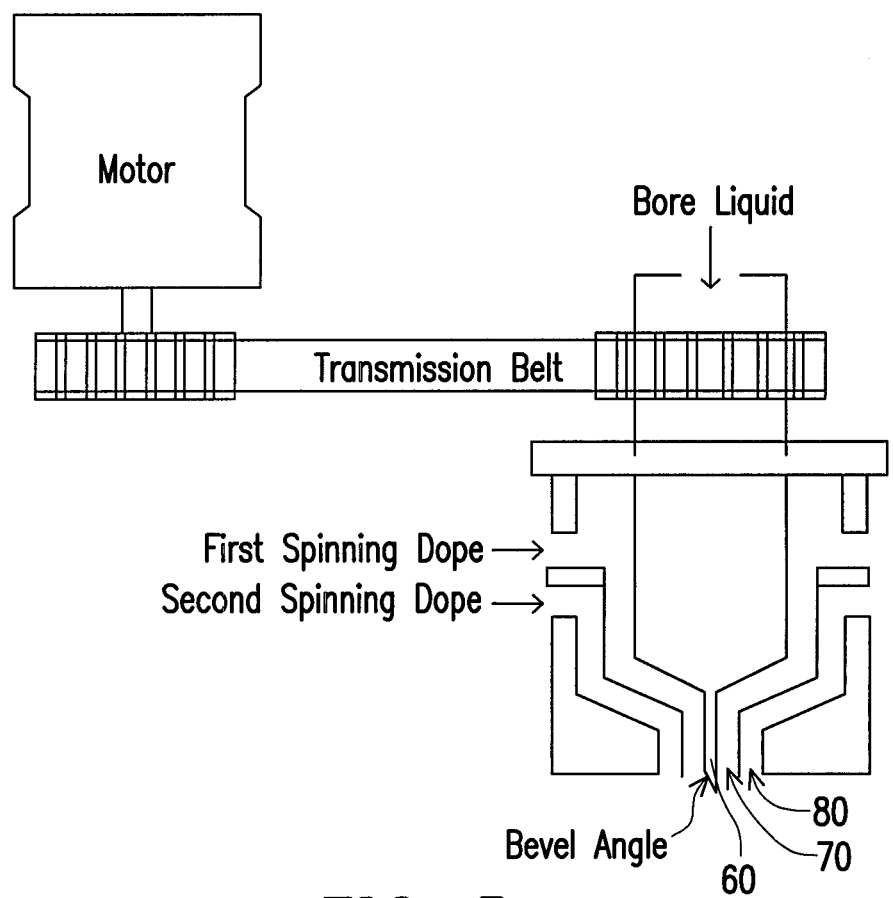
FIG. 3 shows the schematic diagram of an example of the spinning device.

1) A spinneret having a central tube, a first orifice, and a second orifice is provided, wherein the bevel angle of the central tube is 0° to 90°. FIG. 3 shows the schematic diagram of an example of a spinning device including the spinneret, wherein the central tube, the first orifice, and the second orifice is represented by numerals 60, 70, and 80, respectively. In FIG. 3, the bevel angle of the central tube 60 is 45°. The hollow fiber fabricated by using this spinneret will have a spiral channel.

2) The bore fluid (e.g., H$_2$O, acetone, or ethanol) is driven out from the central tube by a pressurized gas (e.g., nitrogen gas at a pressure of 4 bars to 6 bars), and the flow rate thereof is, for example, 4 ml/min to 10 ml/min; the first spinning dope is driven out from the first orifice; the second spinning dope is driven out from the second orifice. To make a hollow fiber with a straight channel, the bevel angle of the central tube is maintained at 0°. To make a hollow fiber with a spiral channel, the bevel angle of the central tube is maintained at an angle greater than 0° while a driving motor having a rotational speed of 60 rpm to 120 rpm and connected to the spinneret is started. The self-spinning central tube thus produces a hollow fiber precursor with a spiral structure.

3) The hollow fiber precursor is coagulated in a coagulated bath with water to aid the phase inversion process.

4) The hollow fiber is placed still in the soaking tank for 24 to 48 hours to be completely solidification.

5) The hollow fiber is then taken out from the condensate tank and dried naturally.

Table 1 is the recipes of the adsorbent hollow fiber.

TABLE 1

| Sample | | solvent/polymer (weight ratio) | adsorbent material/ polymer (weight ratio) |
| --- | --- | --- | --- |
| 1 | inner layer | NMP/PESF (4/1) | (3A, 4A or 5A)/PESF (6/1) |
|   | outer layer | NMP/PESF (4/1) | 13X/PESF (5/1) |
| 2 | inner layer | NMP/PESF (4/1) | (3A, 4A, 5A, 13X, silica gel, or high silica material)/ PESF (5/1) |
|   | outer layer | NMP/PVDF (5/1) | (carbon molecular sieves, activated carbon, carbon black, graphite, or metal oxide)/PESF (5/1) |

Referring to Table 1, Sample 1 is an adsorbent hollow fiber having a double layer structure, wherein the inner layer and the outer layer are both composed of adsorbent material and polymer material. Sample 2 is also an adsorbent hollow fiber having a double layer structure, but the inner layer thereof is composed of adsorbent material and polymer material while the outer layer is composed of conductive material and polymer material. Sometimes, the conductive material in the outer layer also has an adsorption capability; for example, the conductive material can be activated carbon, which is not only electrically conductive but also a typical adsorbent material. The present disclosure of course is not limited to the material listed in Table 1. In fact, nearly all of the existing powder adsorbent can be fabricated into an adsorbent hollow fiber via the process described above.

Figure 4:
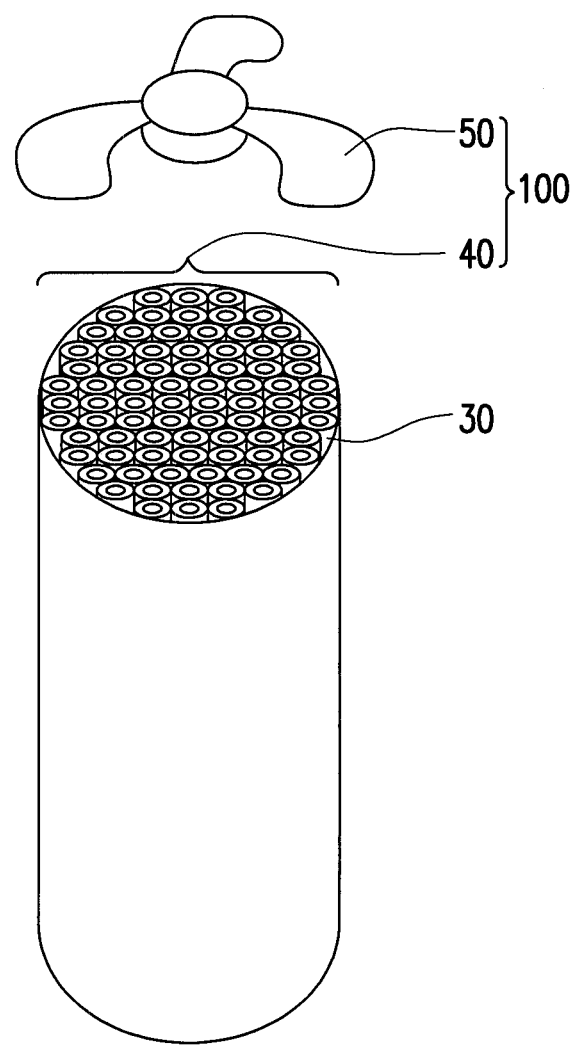
FIG. 4 is the schematic diagram of an embodiment of the dehumidification system.

FIG. 4 illustrates a schematic diagram of an exemplary embodiment of a dehumidification system. As shown in FIG. 4, after completing the fabrication of the adsorbent hollow fiber, an adsorbent hollow fiber module 40 is made by binding a plurality of adsorbent hollow fibers 30's into a bundle by any conventional method. An air directing device 50 (e.g., an exhaust fan) is arranged at an end of the adsorbent hollow fiber module 40. This is a prototype of a dehumidification system 100. As air passes through the adsorbent hollow fibers 30's, the adsorption time is inversely related to the flow rate of gas. The greater the flow rate, the less the adsorption time. Accordingly, the dehumidification rate of the dehumidification system can be adjusted by adjusting the air transportation time of the air directing device 50; for example, if the air directing device 50 is a fan, the rotational speed or power thereof can be adjusted.

In an embodiment, the power of the dehumidification system 100 is about 100 watts, wherein the power of the fan is 0.48 watts to 5 watts, and the power of the power source which drives a current through the conductive fiber (i.e., the PTC heating device) is about 60 watts. If a refrigeration unit is used, the power thereof may be about 30 watts. Further-more, during the operation of the dehumidification system 100, the time during which the heating device or the refrigeration unit turning on is only ⅓ to ½ of the adsorption time; therefore, the total power consumption is much less than 100 watts. Meanwhile, during the operation of the dehumidification system 100, only the fan produces noise, and the value thereof is much less than 25 dBA. In comparison, the commercially available desiccant wheel typically has a power consumption of 200 watts to 600 watts, sometimes even greater than 600 watts. This is because, first, the heating-desorption system of the desiccant wheel operates continuously, and the power of the heating device is greater than ½ of the total power of the system; second, the desiccant wheel uses a high torque fan which has a noise value greater than about 39 dBA and a power of about 50 watts to 60 watts. In short, the power of the dehumidification system 100 is far less than the conventional desiccant wheel system.

The dehumidification system can include elements other than the adsorbent hollow fiber and the air directing device. Some embodiments will be described in the following paragraphs with reference to the Figures.

FIGS. 5A to 5F illustrate the schematic diagrams of some non-limiting embodiments of the dehumidification system. Relative terms, such as "beneath," "below," "lower," "above," "upper," "left," "right," and the like, may be used herein for ease of description to describe one element's relationship to another element(s) as illustrated in the Figures. It will be understood that the spatially relative terms are intended to encompass different orientations of the device in use or operation in addition to the orientation depicted in the Figures. For example, if the device in the figures is turned over, elements described as "below" or "beneath" other elements or would then be oriented "above" the other elements. Thus, the exemplary term "below" can encompass both an orientation of above and below. The device may be otherwise oriented (rotated 90° or at other orientations) and the spatially relative descriptors used herein interpreted accordingly.

Figure 5A:
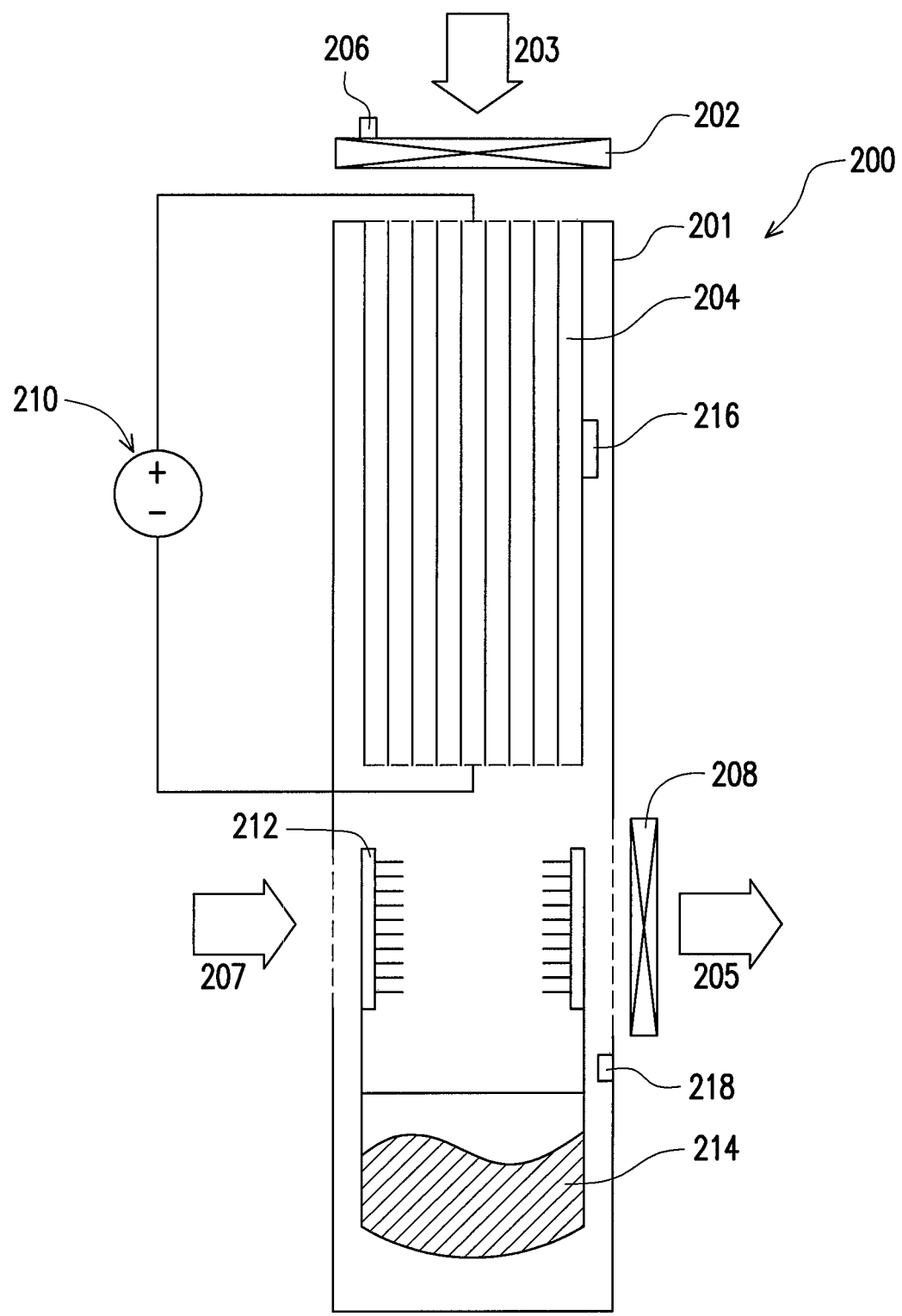
FIGS. 5A-5F show the schematic diagrams of non-limiting embodiments of the dehumidification system.

Referring to FIG. 5A, the dehumidification system 200 includes an air directing device 202 and an adsorbent hollow fiber module 204. The adsorbent hollow fiber module 204 is placed in a housing. The housing is not particularly limited as long as it can accommodate the adsorbent hollow fiber module 204 and the additional elements described below. In this embodiment, the housing is a tube case 201 of which the material includes glass, plastics, or metal. Through FIGS. 5A to 5F, the adsorbent hollow fiber module is presented in a simplified manner (i.e., blocks and lines). It should be understood that, the adsorbent hollow fiber module includes at least one adsorbent hollow fibers (e.g., 100 adsorbent hollow fibers), and the configuration thereof can be similar as shown in FIG. 4.

In this embodiment, the adsorbent hollow fiber contains a conductive material, and the dehumidification system 200 further includes a power source 210 for directing a current through the adsorbent hollow fiber. For example, the power source 210 may be electrically connected to the both ends of the adsorbent hollow fiber module 204. While the power source turns on, the adsorbent hollow fiber is heated by joule heating, and the moisture adsorbed on the adsorbent hollow fiber is desorbed. In other embodiments, if the adsorbent hollow fiber does not contain a conductive material, a heating device may be added into the dehumidification system to enable the water desorption.

In this embodiment, the dehumidification system 200 further includes a humidity sensor 206, a humidity sensor 218, and a refrigeration unit 212. The humidity sensor 206 and the humidity sensor 218 are used to detect the ambient humidity. For example, the humidity sensor 206 can detect the humidity of the air passing through the air directing device 202, and the humidity sensor 218 can detect the humidity inside of the tube case 201, that is, the humidity of the air passing through the adsorbent hollow fiber module 204. The refrigeration unit 212, for example, is a cooler fabricated by a thermoelectric material that condensates the water vapor desorbed from the adsorbent hollow fiber into liquid water. Additionally, the dehumidification system 200 can further includes a control unit (not shown) connected to the air directing device 202, the power source 210 (or the heating device), and the refrigeration unit 212, and coordinates the operations of these elements to optimize the dehumidification function.

When the humidity sensor 206 indicates that the indoor humidity is too high, the dehumidification mode of the dehumidification system 200 is turned on. Air 203 is driven by the air directing device 202 disposed above the adsorbent hollow fiber module 204, passing though the opening at the top of the tube case 201, and entering the adsorbent hollow fiber module 204. After the moisture of the air 203 is adsorbed onto the adsorbent hollow fiber, dry air 205 is driven by an air directing device 208 below the adsorbent hollow fiber module 204 and conveys to the ambient via an opening at the bottom of the tube case 201.

When the humidity sensor 206 indicates that the indoor humidity is too low, or the humidity sensor 218 shows that the adsorbent hollow fiber is saturated, the power source 210 is turned on, resulting in a current passing through the adsorbent hollow fiber which contains a conductive material. The power source 210 is, for example, an AC voltage source (110V). The gaseous water molecule is desorbed from the adsorbent hollow fiber through the heating, and the water vapor may condensate while passing the refrigeration unit 212 (e.g., a heat exchanger network or a cooler), or may condensate by the effect of the cooling air 207. The condensed water is collected by a water tank 214. Besides, with a temperature sensor 216 (e.g., a thermo couple), the temperature of the adsorbent hollow fiber may be controlled below an upper limit, e.g., 150° C., to avoid the system overheating.

Figure 5B:
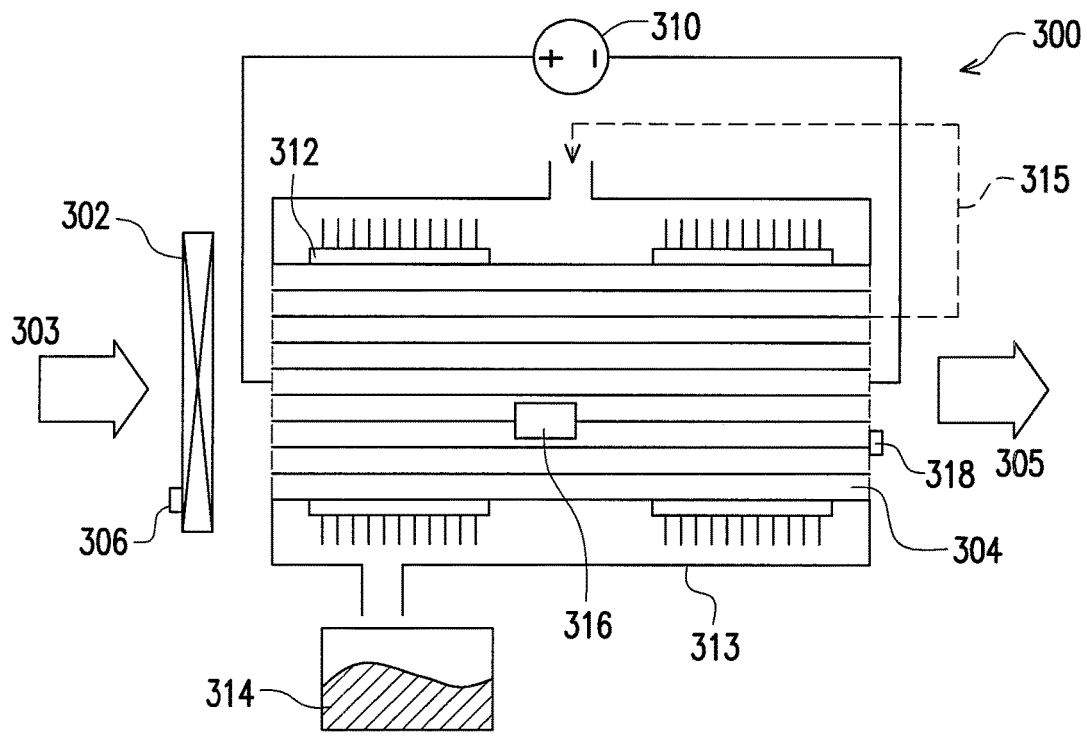

Referring to FIG. 5B, the dehumidification system 300 includes an air directing device 302, an adsorbent hollow fiber module 304, a humidity sensor 306, a humidity sensor 318, a power source 310, a refrigeration unit 312, a condensing zone 313, a water tank 314, and a temperature sensor 316. These elements can be identical to the corresponding ones in FIG. 5A except the condensing zone 313.

When the humidity sensor 306 indicates that indoor humidity is too high, the dehumidification mode of the dehumidification system 300 is turned on. Air 303 is driven by the air directing device 302, entering into the adsorbent hollow fiber module 304 from the left side. After the moisture of the air 303 is adsorbed onto the adsorbent hollow fiber, dry air 305 is discharged from the right side of the adsorbent hollow fiber module 304.

When the humidity sensor 306 indicates that the indoor humidity is too low, or the humidity sensor 318 shows that the adsorbent hollow fiber is saturated, the power source 310 is turned on, resulting in a current passing through the adsorbent hollow fiber. The gaseous water molecule is desorbed from the adsorbent hollow fiber through the heating. The hot water vapor enters the condensing zone 313, and the refrigeration unit 312 is turned on to condensate the water vapor. The condensed water is collected by the water tank 314. The waste heat produced by the refrigeration unit 312 can be provided to the adsorbent hollow fiber module 304, further inducing the water desorption. By an additional design of pipeline, the hot air 305 discharged from the right side of the adsorbent hollow fiber module 304 can be directed along the path 315 and moves back to the condensing zone 313 to heat the adsorbent hollow fiber module 304 again. During this process, with the temperature sensor 316, the temperature of the adsorbent hollow fiber may be controlled below an upper limit, e.g., 150° C., to avoid the system overheating.

Figure 5C:
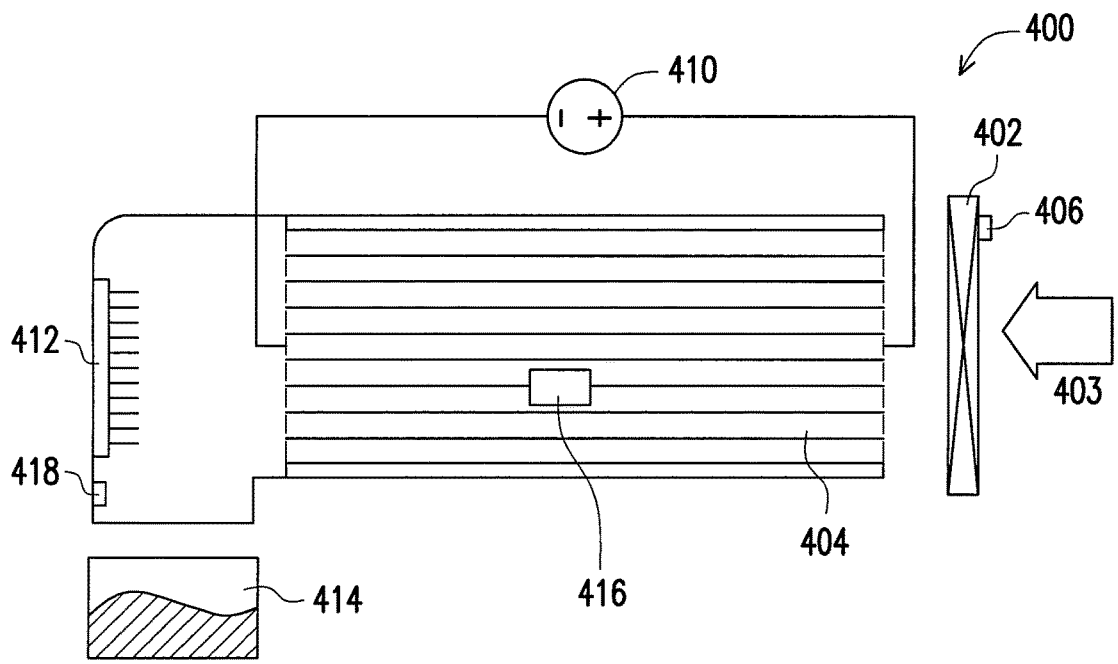

Referring to FIG. 5C, the dehumidification system 400 includes an air directing device 402, an adsorbent hollow fiber module 404, a humidity sensor 406, a humidity sensor 418, a power source 410, a refrigeration unit 412, a water tank 414, and a temperature sensor 416.

When the humidity sensor 406 indicates that indoor humidity is too high, the dehumidification mode of the dehumidification system 400 is turned on. Air 403 is driven by the air directing device 402, entering into the adsorbent hollow fiber module 404 from the right side. After the moisture of the air 403 is adsorbed onto the adsorbent hollow fiber, dry air is discharged from the left side of the adsorbent hollow fiber module 404.

When the humidity sensor 406 indicates that the indoor humidity is too low, or the humidity sensor 418 shows that the adsorbent hollow fiber is saturated, the power source 410 is turned on, resulting in a current passing through the adsorbent hollow fiber. The gaseous water molecule is desorbed from the adsorbent hollow fiber through the heating and condensates as passing through the refrigeration unit 412. The condensed water is collected by the water tank 414. With the temperature sensor 416, the temperature of the adsorbent hollow fiber may be controlled below an upper limit, e.g., 150° C., to avoid the system overheating.

Figure 5D:
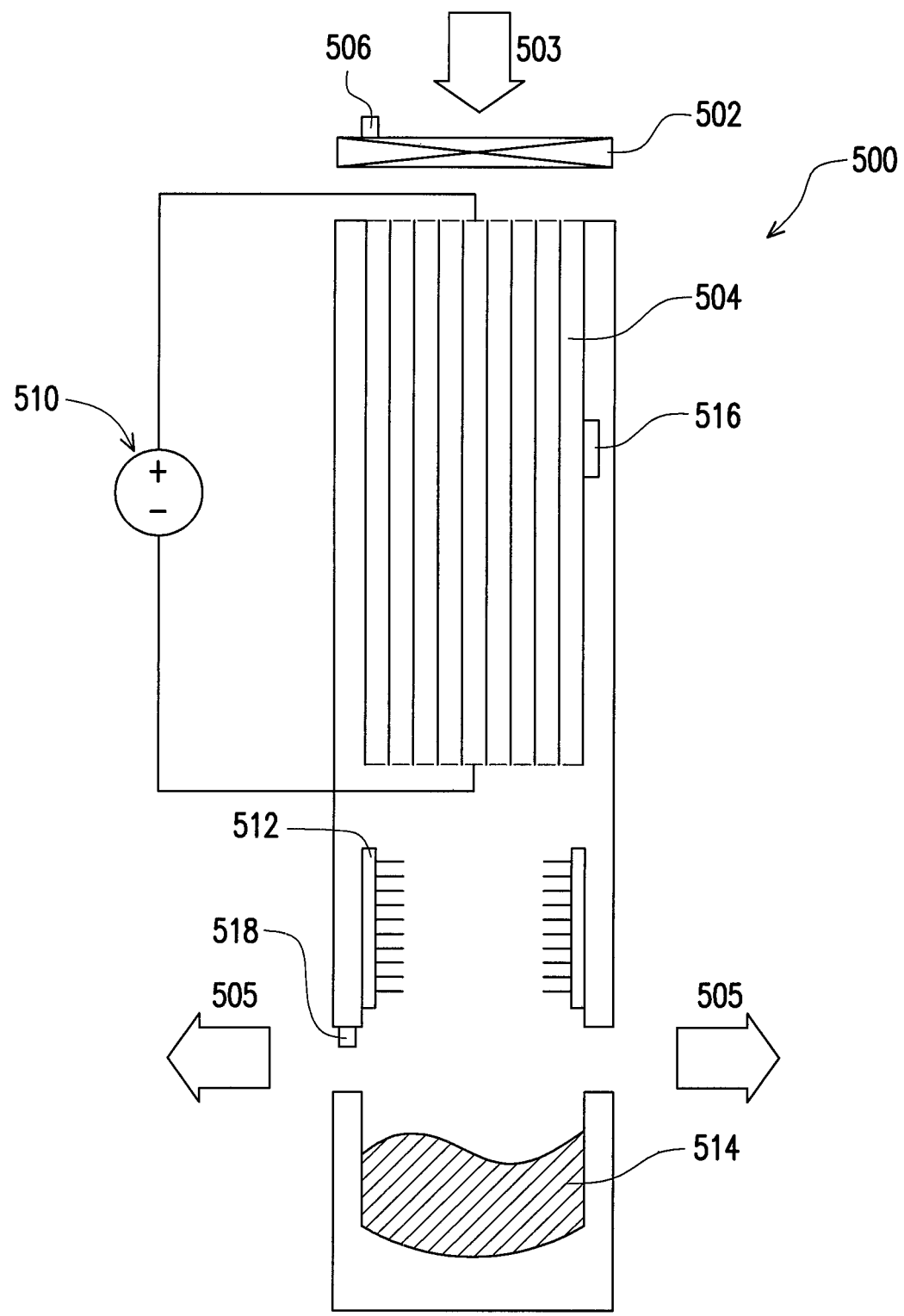

Referring to FIG. 5D, the dehumidification system 500 includes an air directing device 502, an adsorbent hollow fiber module 504, a humidity sensor 506, a humidity sensor 518, a power source 510, a refrigeration unit 512, a water tank 514, and a temperature sensor 516.

When the humidity sensor 506 indicates that indoor humidity is too high, the dehumidification mode of the dehumidification system 500 is turned on. Air 503 is driven by the air directing device 502, entering into the adsorbent hollow fiber module 504 from the upper side. After the moisture of the air 503 is adsorbed onto the adsorbent hollow fiber, dry air 505 is discharged from the bottom side of the adsorbent hollow fiber module 504.

When the humidity sensor 506 indicates that the indoor humidity is too low, or the humidity sensor 518 shows that the adsorbent hollow fiber is saturated, the power source 510 is turned on, resulting in a current passing through the adsorbent hollow fiber. The gaseous water molecule is desorbed from the adsorbent hollow fiber through the heating and may condensate as passing through the refrigeration unit 512. The condensed water is collected by the water tank 514. With the temperature sensor 516, the temperature of the adsorbent hollow fiber may be controlled below an upper limit, e.g., 150° C., to avoid the system overheating.

Figure 5E:
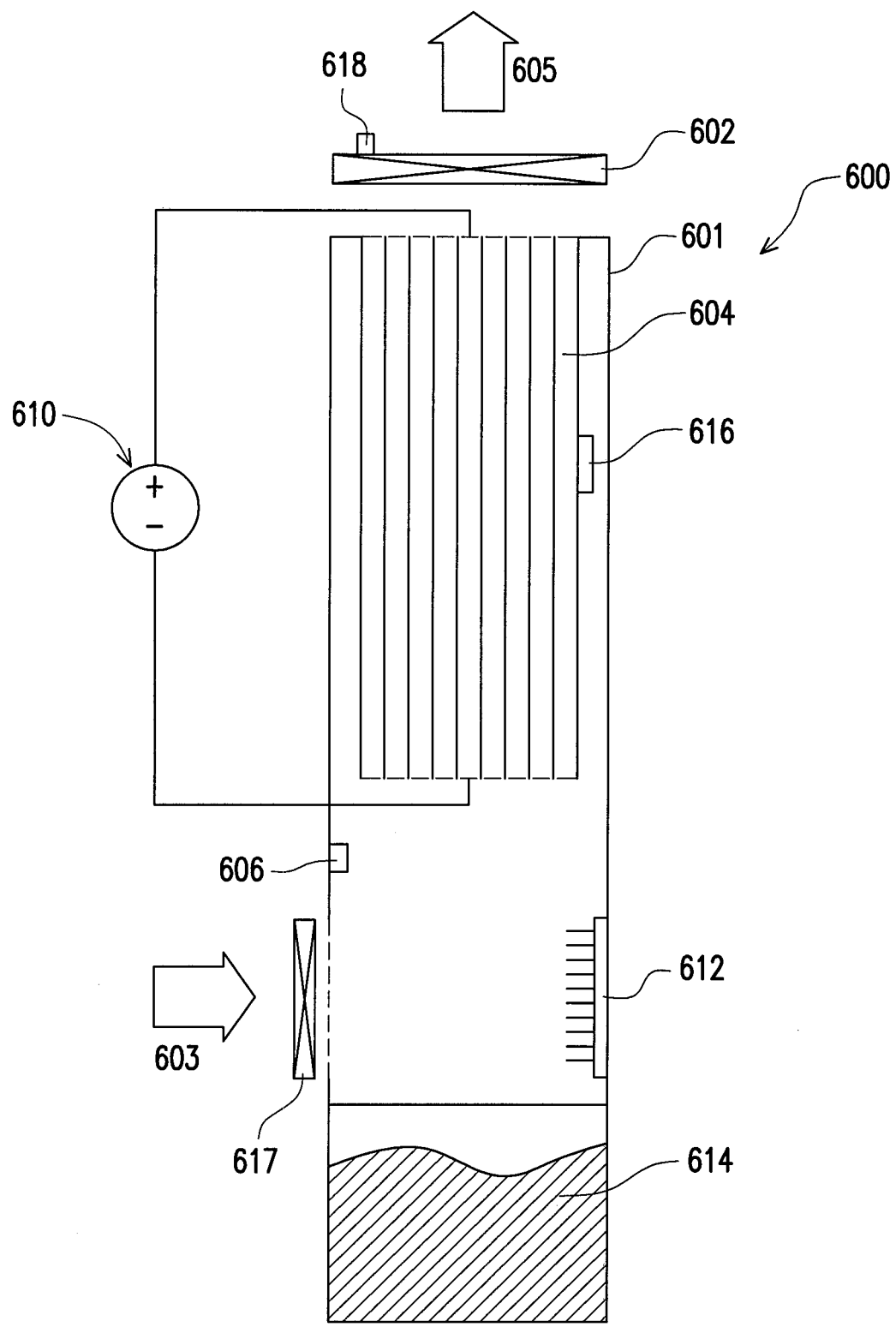

Referring to FIG. 5E, the dehumidification system 600 includes an air directing device 602, an adsorbent hollow fiber module 604, a humidity sensor 606, a humidity sensor 618, a power source 610, a refrigeration unit 612, a water tank 614, a temperature sensor 616, and a pump 617.

When the humidity sensor 606 indicates that indoor humidity is too high, the dehumidification mode of the dehumidification system 600 is turned on. Air 603 is driven by the air directing device 602, entering into the adsorbent hollow fiber module 604 from an opening at the bottom of the tube case 601. After the moisture of the air 603 is adsorbed onto the adsorbent hollow fiber, dry air 605 is discharged from an opening at the upper side of the tube case 601.

When the humidity sensor 606 indicates that the indoor humidity is too low, or the humidity sensor 618 shows that the adsorbent hollow fiber is saturated, the power source 610 is turned on, resulting in a current passing through the adsorbent hollow fiber. At the same time, the pump 617 is turned on and the air directing device 602 is turned off. At this time, the air moves oppositely (i.e., top-down) as compared to the desorption process. The gaseous water molecule is desorbed from the adsorbent hollow fiber through the heating and may condensate as passing through the refrigeration unit 612. The condensed water is collected by the water tank 614. With the temperature sensor 616, the temperature of the adsorbent hollow fiber may be controlled below an upper limit, e.g., 150° C., to avoid the system overheating.

Figure 5F:
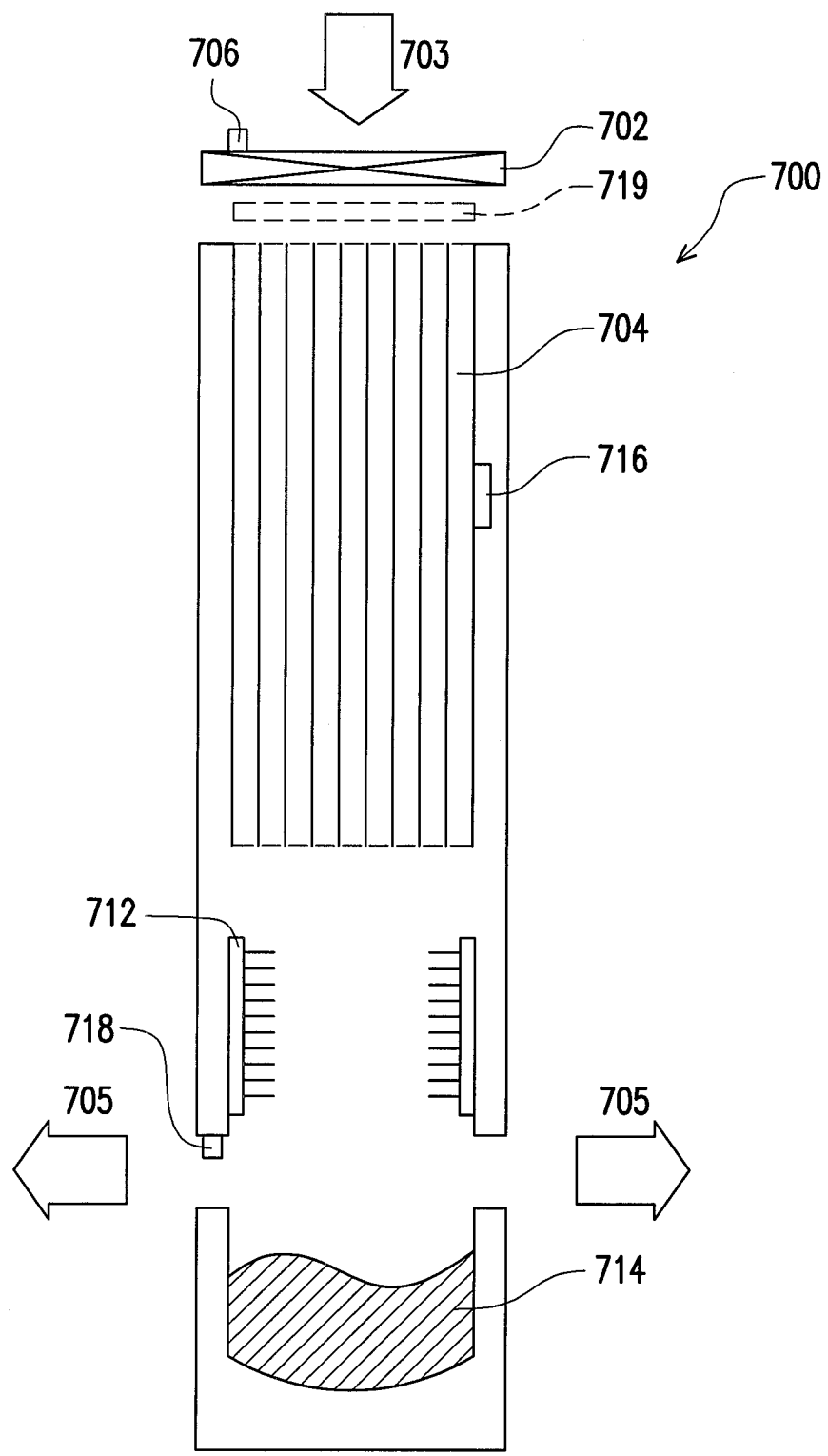

Referring to FIG. 5F, the dehumidification system 700 includes an air directing device 702, an adsorbent hollow fiber module 704, a humidity sensor 706, a humidity sensor 718, a refrigeration unit 712, a water tank 714, and a heating device 719.

When the humidity sensor 706 indicates that indoor humidity is too high, the dehumidification mode of the dehumidification system 700 is turned on. Air 703 is driven by the air directing device 702, entering into the adsorbent hollow fiber module 704 from the upper side. After the moisture of the air 703 is adsorbed onto the adsorbent hollow fiber, dry air 705 is discharged from openings at the bottom side of the adsorbent hollow fiber module 704.

When the humidity sensor 706 indicates that the indoor humidity is too low, or the humidity sensor 718 shows that the adsorbent hollow fiber is saturated, the heating device 719 is turned on. The heating device 719 is, for example, a PTC heating device self-controlled at 200° C. The gaseous water molecule is desorbed from the adsorbent hollow fiber through the heating and may condensate as passing through the refrigeration unit 712. The condensed water is collected by the water tank 714.

Some embodiments have been described so far. It should be pointed out that this disclosure is not limited to these embodiments. Elements described in the above embodiments, if necessary and suitable, can be combined with each other or be arranged into different spatial relationship to construct a different embodiment. For example, the heating device 719 in FIG. 5F can be combined with the dehumidification system 200 in FIG. 5A to form a dehumidification system different from those described above. This embodiment and any other possible embodiments all fall within the scope of this disclosure.

Experimental

Effects of the abovementioned embodiments will be evinced through the experimental examples. Although some experimental details are specifically described in the following section, the material used, the amount thereof, and the detailed process flow can be suitably modified without departure from the scope of this disclosure. Therefore, the scope of this disclosure should not be limited by the following experiments.

Figure 6:
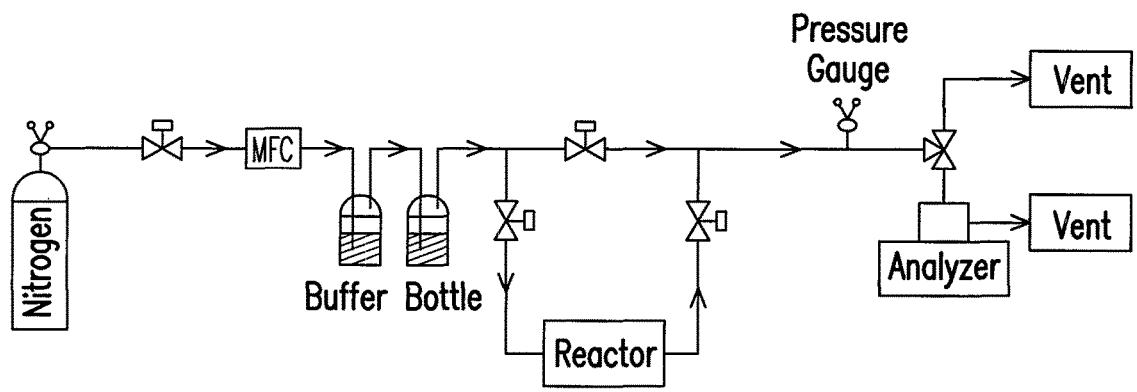
FIG. 6 illustrates the experimental system of the water vapor adsorption experiments.

FIG. 6 illustrates the experimental system of the water vapor adsorption experiments. In the experiment, $N_2$ was selected as the carrier gas carrying the water vapor into the reactor. Different adsorbent materials (a conventional adsorbent material or the adsorbent hollow fiber module described above) were placed in the reactor. The flow rate of $N_2$ was controlled at 1 L/min and 5 L/min by the mass flow controller (MFC). The reaction pressure can be controlled by the pressure gauge at the backend of the reactor. $N_2$ gas was passed into the buffer bottle filled with water, so that the relative humidity of the gas flowing out was 100% RH (at dew-point 20° C.). When the experimental factors became stable, the adsorption experiment was conducted. A TEKHNE TK-100 Dewpoint Transmitter analyzed the air passing through the reactor and determined the variation of the dew point of the air instantly, thereby obtaining the water adsorption ability of the adsorbent material.

The molecular sieve used in the experiment is the commercial product 13X produced by Universal Oil Products (UOP) Company. The conventional adsorbent material is used in its powder form. The adsorbent hollow fiber can be divided into a "straight" sample (13X-straight) and a "spiral" sample (13X-spiral) depending on the channel structure.

Figure 7:
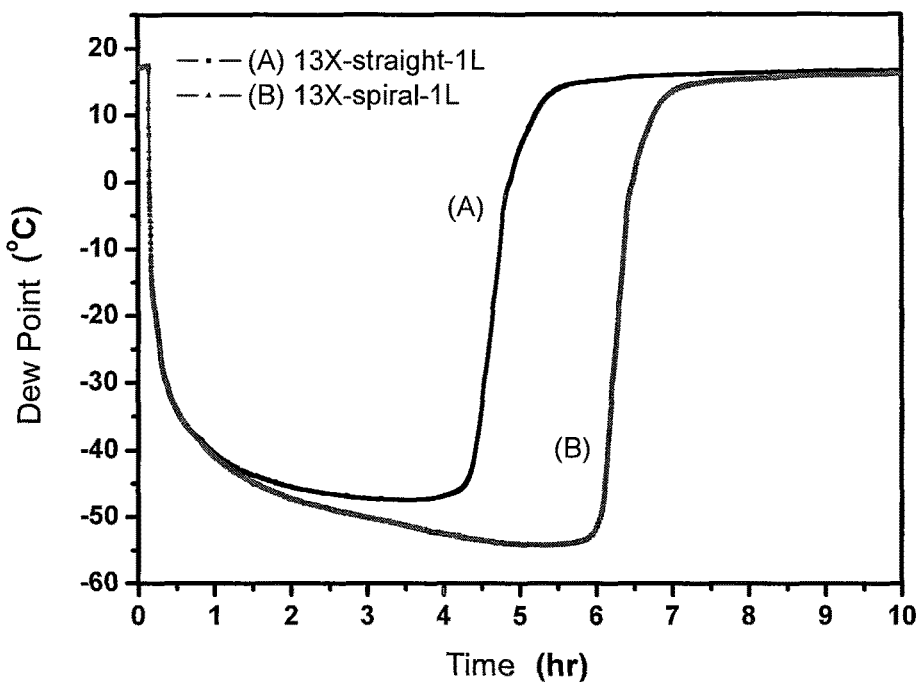
FIG. 7 shows the adsorption curves of the adsorbent hollow fiber with a straight channel and the adsorbent hollow fiber with a spiral channel under atmospheric pressure and a gas flow rate of 1 L/min.

FIG. 7 shows the adsorption curves of the adsorbent hollow fiber with a straight channel and the adsorbent hollow fiber with a spiral channel under atmospheric pressure and a gas flow rate of 1 L/min.

Referring to FIG. 7, the adsorption time of the adsorbent hollow fiber with a spiral channel is longer; this is because the spiral channel increases the adsorption length and, in turn, the time during which the water vapor contacts with the adsorbent material. An adsorbent hollow fiber with a spiral channel, therefore, adsorbs more water vapor than an adsorbent hollow fiber with a straight channel when the material amount, the gas pressure, and the gas flow rate are set as control variables.

Figure 8:
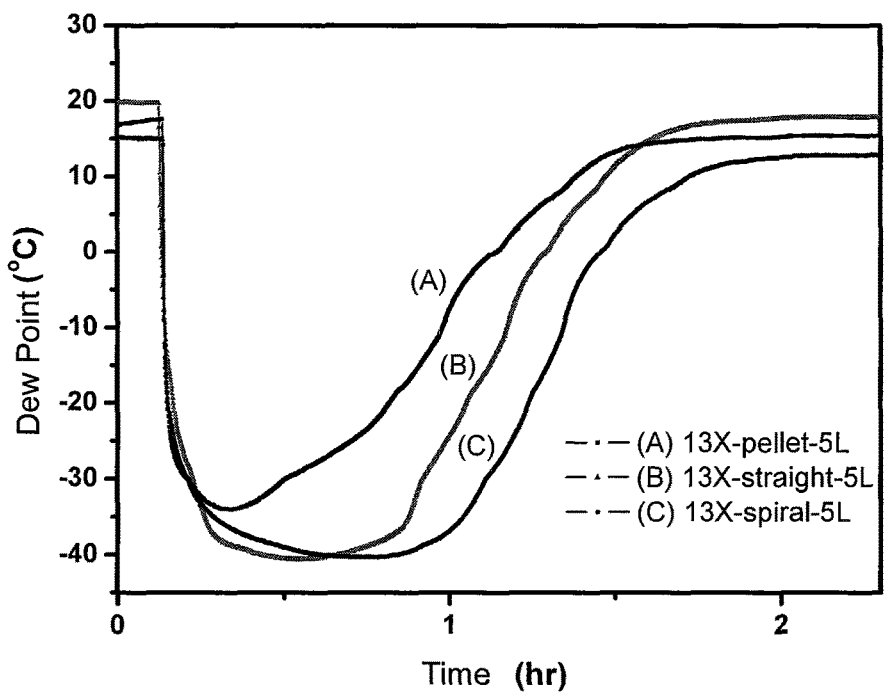
FIG. 8 shows the adsorption curves of the conventional pellet adsorbent and the adsorbent hollow fiber with a straight channel and the adsorbent hollow fiber with a spiral channel under atmospheric pressure and a gas flow rate of 5 L/min.

FIG. 8 shows the adsorption curves of the conventional pellet adsorbent and the adsorbent hollow fiber with a straight channel and the adsorbent hollow fiber with a spiral channel under atmospheric pressure and a gas flow rate of 5 L/min. The adsorption results of the adsorbent hollow fibers are better than that of conventional pellet adsorbent whether the channel structure is straight or spiral. This is because the inner layer of the adsorbent hollow fiber is a porous layer having a coral-like or dendrite structure which provides channel for an effective gas adsorption.

Figure 9:
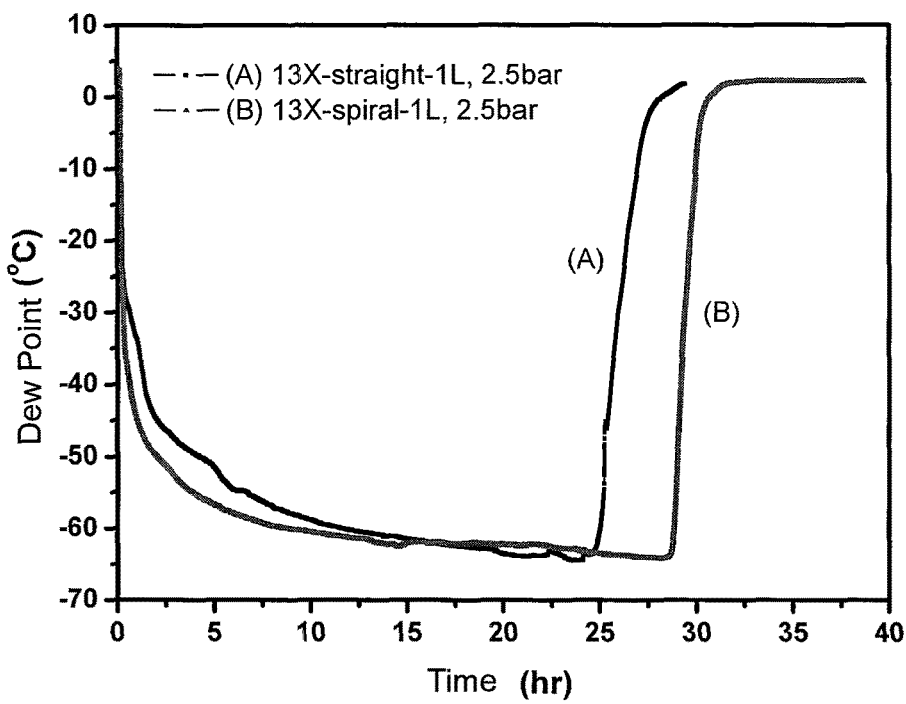
FIG. 9 shows the adsorption curves of the adsorbent hollow fiber with a straight channel and the adsorbent hollow fiber with a spiral channel under a pressure of 2.5 bars and a gas flow rate of 1 L/min.

FIG. 9 shows the adsorption curves of the adsorbent hollow fiber with a straight channel and the adsorbent hollow fiber with a spiral channel under a pressure of 2.5 bars and a gas flow rate of 1 L/min. Referring to FIG. 9, an adsorbent hollow fiber with a spiral channel has a longer adsorption time and a better instantaneous adsorption capacity as compared to the adsorbent hollow fiber with a straight channel. The difference between the two samples in the breakthrough time is approximately 5 hours.

Figure 10:
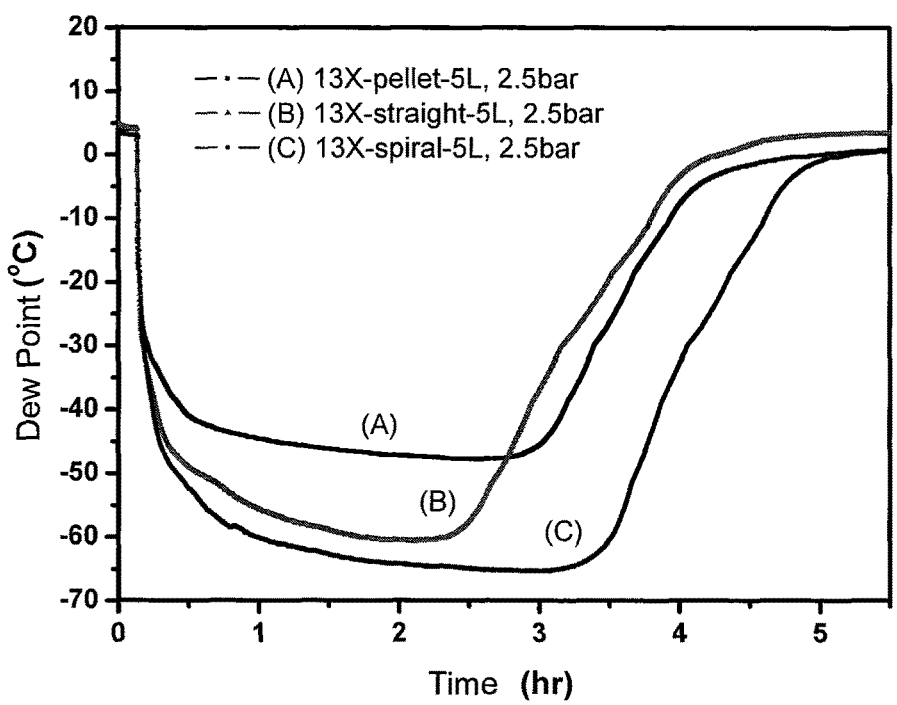
FIG. 10 shows the adsorption curves of the conventional pellet adsorbent and the adsorbent hollow fiber with a straight channel and the adsorbent hollow fiber with a spiral channel under a pressure of 2.5 bars and a gas flow rate of 5 L/min.

FIG. 10 shows the adsorption curves of the conventional pellet adsorbent and the adsorbent hollow fiber with a straight channel and the adsorbent hollow fiber with a spiral channel under a pressure of 2.5 bars and a gas flow rate of 5 L/min. Still, the adsorbent hollow fiber with a spiral channel exhibits a better adsorption result, the breakthrough time thereof being longer than that of adsorbent hollow fiber with a straight channel by 1 hour. Meanwhile, the adsorption effect of the 13X-pellet adsorbent material is inferior to both of the adsorbent hollow fiber; the minimum value of dew point obtained with the 13X-pellet is −45° C., which is significantly greater than the minimum dew point obtained with the adsorbent hollow fiber.

Figure 11A:
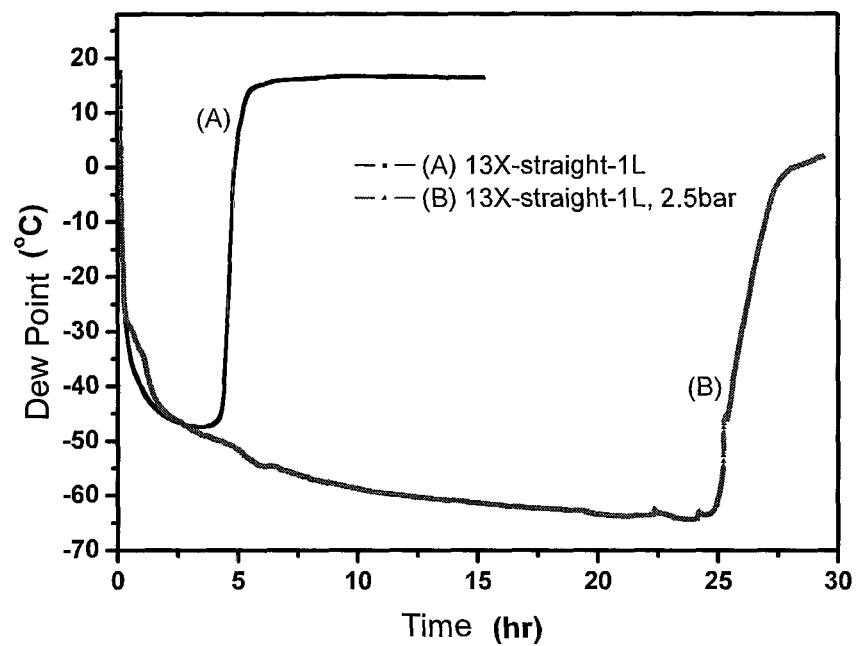
FIG. 11A shows the adsorption curves of the adsorbent hollow fibers with a straight channel under atmospheric pressure and a pressure of 2.5 bars, respectively, while the gas flow rate is 1 L/min.
Figure 11B:
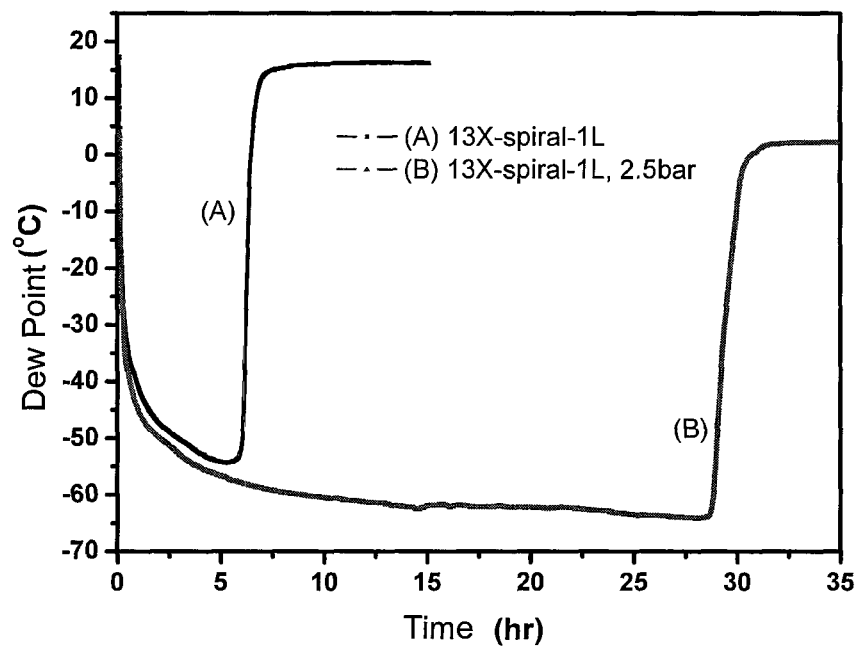
FIG. 11B shows the adsorption curves of the adsorbent hollow fibers with a spiral channel under atmospheric pressure and a pressure of 2.5 bars, respectively, while the gas flow rate is 1 L/min.

FIG. 11A shows the adsorption curves of the adsorbent hollow fibers with a straight channel under atmospheric pressure and a pressure of 2.5 bars, respectively, while the gas flow rate is 1 L/min. FIG. 11B shows the adsorption curves of the adsorbent hollow fibers with a spiral channel under atmospheric pressure and a pressure of 2.5 bars, respectively, while the gas flow rate is 1 L/min. When the pressure attains 2.5 bars, the minimum dew point achieves about −60° C., and the adsorption time is as long as 30 hours, which means the adsorption effect is enhanced with the increase of pressure. This is because the high pressure makes it more possible for the gaseous molecule to diffuse into the adsorbent hollow fiber, and thus more adsorption sites can be utilized.

Accordingly, the disclosure provides a dehumidification system including an adsorbent hollow fiber and an air directing device. The adsorbent hollow fiber has a porous structure and contains a high content of an adsorbent material and a polymer material which can be used as binder. As compared to the existing adsorbent material, the adsorbent hollow fiber provided by this disclosure has a faster adsorption rate, a longer adsorption time, a lighter weight, and a less volume. If a conductive material with PTC property is further added into the adsorbent hollow fiber, the adsorbent hollow fiber itself can, with the application of a voltage, act as a heat source supplying heat energy for the gas desorption. The conductive material with PTC property can also provide a protection function to ensure the application safety.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A dehumidification system, comprising:
an air directing device for conveying air, and
an adsorbent hollow fiber module for adsorbing moisture in the air as the air passes through the adsorbent hollow fiber module, wherein the adsorbent hollow fiber module comprises at least one adsorbent hollow fiber, wherein the adsorbent hollow fiber is a two-layer structure or a multi-layer structure comprising at least a first layer and a second layer, and the adsorbent hollow fiber comprises:
a tubular body having a first end and a second end, and
a channel disposed in the tubular body and extending from the first end to the second end, wherein the channel comprises a winding channel or a spiral channel;
wherein the tubular body has an outer surface which is straight in the longitudinal direction.

2. The dehumidification system of claim 1, wherein the adsorbent hollow fiber module comprises an adsorbent hollow fiber bundle composed of a plurality of the adsorbent hollow fibers.

3. The dehumidification system of claim 1, wherein the adsorbent hollow fiber comprises a polymer material and an adsorbent material.

4. The dehumidification system of claim 3, wherein the polymer material comprises polyethersulfone (PESF), polyphenylsulfone (PPSU), or polyimide (PI).

5. The dehumidification system of claim 3, wherein the adsorbent material comprises type A zeolite, type X zeolite, type Y zeolite, silica gel, carbon molecular sieve, high silica molecular sieve, activated carbon, or a combination thereof.

6. The dehumidification system of claim 3, wherein the adsorbent hollow fiber further comprises a conductive material.

7. The dehumidification system of claim 1, wherein the first layer and the second layer comprise different adsorbent materials.

8. The dehumidification system of claim 1, wherein the first layer comprises an adsorbent material and the second layer comprises a conductive material.

9. The dehumidification system of claim 8, wherein the first layer is disposed inside of the second layer.

10. The dehumidification system of claim 8, wherein the first layer is disposed outside of the second layer.

11. The dehumidification system of claim 6, wherein the conductive material comprises activated carbon, graphite, carbon black, metal powder, metal oxide, or a combination thereof.

12. The dehumidification system of claim 6, wherein the conductive material has a positive temperature coefficient of resistance (PTC).

13. The dehumidification system of claim 12, further comprising a power source for directing a current through the adsorbent hollow fiber.

14. A dehumidification system, comprising:
an air directing device for conveying air, and
an adsorbent hollow fiber module for adsorbing moisture in the air as the air passes through the adsorbent hollow fiber module, wherein the adsorbent hollow fiber module comprises at least one adsorbent hollow fiber wherein the adsorbent hollow fiber is a two-layer structure or a multi-layer structure comprising at least a first layer and a second layer, and the adsorbent hollow fiber comprises:
a tubular body having a first end and a second end,
a channel disposed in the tubular body and extending from the first end to the second end, wherein the channel comprises a winding channel or a spiral channel; and
a refrigeration unit for condensing the moisture desorbed from the adsorbent hollow fiber into liquid water.

15. The dehumidification system of claim 1, further comprising a humidity sensor for detecting an ambient humidity.

16. A dehumidification system, comprising:
an air directing device for conveying air, and
an adsorbent hollow fiber module for adsorbing moisture in the air as the air passes through the adsorbent hollow fiber module, wherein the adsorbent hollow fiber module comprises at least one adsorbent hollow fiber, wherein the adsorbent hollow fiber is a two-layer structure or a multi-layer structure comprising at least a first layer and a second layer, and the adsorbent hollow fiber comprises:
a tubular body having a first end and a second end,
a channel disposed in the tubular body and extending from the first end to the second end, wherein the channel comprises a winding channel or a spiral channel;
a first humidity sensor disposed on the air directing device for detecting an humidity of the air passing through the air directing device;
a housing having a first opening and a second opening, the adsorbent hollow fiber module disposed in the housing, the air directing device disposed adjacent to the first opening, and the air entering or leaving the housing via the first opening or the second opening;
a refrigeration unit disposed in the housing for condensing the moisture desorbed from the adsorbent hollow fiber into liquid water;
a water tank disposed in the housing for storing the liquid water;
a second humidity sensor disposed in the housing and positioned downstream to the adsorbent hollow fiber module for detecting a humidity of the air passing through or to be passed through the adsorbent hollow fiber module; and
a temperature sensor disposed on the adsorbent hollow fiber module for detecting a temperature of the adsorbent hollow fiber module;
wherein the air directing device is a first air directing device for passing the air through the adsorbent hollow fiber module.

17. The dehumidification system of claim 16, further comprising a second air directing device disposed adjacent to the second opening for conveying the air into or out from the housing.

18. The dehumidification system of claim 16, further comprising a power source for directing a current through the adsorbent hollow fiber.

19. The dehumidification system of claim 16, further comprising a heating device for desorbing the moisture adsorbed on the adsorbent hollow fiber.

* * * * *